(12) United States Patent
Wenger et al.

(10) Patent No.: US 8,344,911 B1
(45) Date of Patent: Jan. 1, 2013

(54) SYSTEM, MODULE, AND METHOD FOR GENERATING NON-LINEARLY SPACED GRADUATIONS FOR A SYMBOLIC LINEAR SCALE

(75) Inventors: Jason C. Wenger, Cedar Rapids, IA (US); Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 381 days.

(21) Appl. No.: 12/708,163

(22) Filed: Feb. 18, 2010

(51) Int. Cl.
G02F 12/00 (2006.01)
(52) U.S. Cl. .......... 340/973; 340/974; 340/975; 701/14
(58) Field of Classification Search ................ 701/4, 14; 340/971–975, 979
See application file for complete search history.

(56) References Cited

U.S. PATENT DOCUMENTS

| | | | |
|---|---|---|---|
| 4,147,056 A * | 4/1979 | Muller | 73/178 T |
| 5,289,185 A * | 2/1994 | Ramier et al. | 340/971 |
| 6,057,786 A * | 5/2000 | Briffe et al. | 340/975 |
| 6,219,594 B1 * | 4/2001 | Nicosia et al. | 701/16 |
| 6,489,898 B1 * | 12/2002 | Nicholls | 340/975 |
| 7,224,311 B2 * | 5/2007 | Tanygin et al. | 342/443 |
| 7,602,407 B2 * | 10/2009 | Gerlach et al. | 345/643 |
| 8,094,188 B1 * | 1/2012 | Yum et al. | 348/113 |
| 2010/0026525 A1 * | 2/2010 | Feyereisen et al. | 340/972 |

* cited by examiner

*Primary Examiner* — Kaitlin Joerger
(74) *Attorney, Agent, or Firm* — Donna P. Suchy; Daniel M. Barbieri

(57) ABSTRACT

Present novel and non-trivial system, module, and method for generating non-linearly spaced graduations for a symbolic linear scale are disclosed. Symbology data representative of a scale having non-linear graduations is generated as a function of a graduation reference assigned to each graduation, navigation reference data provided from an appropriate source, and a constant. Navigation reference data comprises pitch attitude data and/or aircraft heading data, from which a symbolic pitch attitude scale and/or heading scale is generated. Current attitude and/or heading may be used as a central reference from which spacing is measured, and the value of the constant is dependent on the size of the scale occupied on the screen of a display unit. Each symbolic linear scale may be merged with data representative of the scene outside the aircraft and presented on the screen along with a flight path predictor mapped to the non-linear scale.

24 Claims, 6 Drawing Sheets

SYSTEM, MODULE, AND METHOD FOR GENERATING NON-LINEARLY SPACED GRADUATIONS FOR A SYMBOLIC LINEAR SCALE

BACKGROUND OF THE INVENTION

1. Field of the Invention

This invention pertains generally to the field of aircraft display units that provide flight information to the pilot or flight crew of an aircraft.

2. Description of the Related Art

The generation of a three-dimensional image of terrain in a synthetic vision system may be accomplished using OpenGL, a standard specification defining a software interface to graphics hardware. A series of processing steps known generally as an "OpenGL Pipeline" are employed to render three-dimensional image data for presentation on the two-dimensional screen of a display unit. One of the processing steps known generally as "OpenGL Transformation" receives vertex data such as three-dimensional terrain data and transforms such data into two-dimensional screen coordinates (or window coordinates) data.

OpenGL Transformation is a series of processing steps known to those skilled in the art, and only a brief summary of these steps is provided. Coordinates of an object may be derived from vertex data, where object coordinates are measured in reference to object space. When the object coordinates are multiplied by a matrix known generally as GL_MODELVIEW, eye coordinates of the object are yielded, where eye coordinates are measured in reference to eye space. When the eye coordinates are multiplied by a matrix known generally as GL_PROJECTION which integrates, clipping and normalized device coordinates ("NDC") transformations, the eye coordinates of the object will become mapped to NDC. Then, by means of a viewport transformation, the coordinates of the NDC are scaled and translated in order to fit into the screen.

The GL_PROJECTION matrix includes a defined frustum for the purpose of performing the clipping transformation. In a perspective projection, a pyramid frustum originating from the origin of the eye coordinate system is generally employed, where the pyramid frustum has been truncated by a near plane (or projection plane). Objects and partial objects falling inside the truncated frustum will be projected onto the near plane, and those falling outside of the frustum will be clipped out.

A notable feature of the projection is that identical objects located at different positions within the frustum and at the same distance from the origin of the eye coordinate system may appear differently on the near plane as a result of the projection. An object located near the periphery of the frustum will appear to be stretched and distorted on the near plane from that of an identical object located near the center of the frustum. For example, a sphere located near the periphery of the frustum will appear to be stretched and distorted when compared with the projection an identical sphere located near the center of the frustum and at the same distance from the origin. Without correction, this stretching and distortion survives NDC and viewport transformations.

When applied to the generation of a three-dimensional terrain image, terrain located at the same distance from the aircraft position will appear to stretch outwardly from the center of the image when presented on the two-dimensional screen, where the center of the image is based on the center of frustum. If symbology representative of attitude (e.g., pitch scale or pitch tape) provides for a linear scale with equally-spaced graduations, a non-conformality may result between the symbology and the image of terrain when the former is presented against the background of the latter.

BRIEF SUMMARY OF THE INVENTION

The embodiments disclosed herein present of a non-trivial system, module, and methods for generating non-linearly spaced graduations for a symbolic linear scale that are conformal to a three-dimensional perspective of a scene outside an aircraft. The embodiments disclosed herein may be used to enhance the safety of flight by preventing a mismatch of information presented on the screen of a display unit.

In one embodiment, a system for generating non-linearly spaced graduations for a symbolic linear scale is disclosed. The system could comprise a source of navigation reference data and a symbology generator, where navigation reference data could be representative of aircraft attitude and/or heading. After receiving the navigation reference data, the symbology generator may generate symbology data representative of one or more symbolic linear scales having non-linearly spaced graduations. Such symbology data may be generated as a function of a graduation reference assigned to the graduation, the aircraft reference data, and a constant, where the value of the constant may depend on the screen size of the scale.

In an additional embodiment of the system, a source of pixel image data could be included. Then, the generated symbology data could be merged with a pixel image data set representative of a three-dimensional perspective of a scene outside the aircraft, such that an image data set representative of each symbolic linear scale against the background of the perspective of the scene is produced. The image data set may be provided to a display unit for the subsequent display of the image represented in the image data set.

In an additional embodiment, the navigation reference data could include data representative of one or more flight path predictors such as a flight path vector, flight director, and/or highway-in-the-sky. The formation of the image data set could include the flight path predictor data, such that flight path predictor symbology is mapped to the screen coordinates corresponding to each symbolic linear scale and presented against the background of the perspective of the scene.

In another embodiment, a module for generating non-linearly spaced graduations for a symbolic linear scale is disclosed. The module could comprise input and output interfaces and a symbology generator, where each interface facilitates the transfer of data to and from the symbology generator. After receiving navigation reference data from an applicable source via the input interface, the symbology generator may generate symbology data, where such symbology data may be generated as a function of a graduation reference assigned to the graduation, the aircraft reference data, and a constant; the value of the constant may depend on the screen size of the scale.

In an additional embodiment of the module, a pixel image data set could be provided via the input interface. Then, the pixel image data set could be merged with the generated symbology data, such that an image data set is produced. The image data set may be provided to a display unit via the output interface, whereby an image represented in the image data set is presented on the screen of the display unit.

In an additional embodiment of the module, the navigation reference data could include data representative of one or more flight path predictors such as a flight path vector, flight director, and/or highway-in-the-sky. The production of the image data set could include the flight path predictor data, such that flight path predictor symbology is mapped to the screen coordinates corresponding to each symbolic linear scale and presented against the background of the perspective of the scene.

In another embodiment, a method for generating non-linearly spaced graduations for a symbolic linear scale is disclosed. Navigation reference data may be received, and symbology data may be generated, where such symbology data may be generated as a function of a graduation reference assigned to the graduation, the aircraft reference data, and a constant; the value of the constant may depend on the screen size of the scale.

In an additional embodiment of the method, a pixel image data set may be received and merged with the symbology data, such that an image data set is produced. The image data set may be provided to a display unit, whereby an image represented in the image data set is presented on the screen of the display unit.

In an additional embodiment of the method, the navigation reference data could include data representative of one or more flight path predictors such as a flight path vector, flight director, and/or highway-in-the-sky. The production of the image data set could include the flight path predictor data, such that flight path predictor symbology is mapped to the screen coordinates corresponding to each symbolic linear scale and presented against the background of the perspective of the scene.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
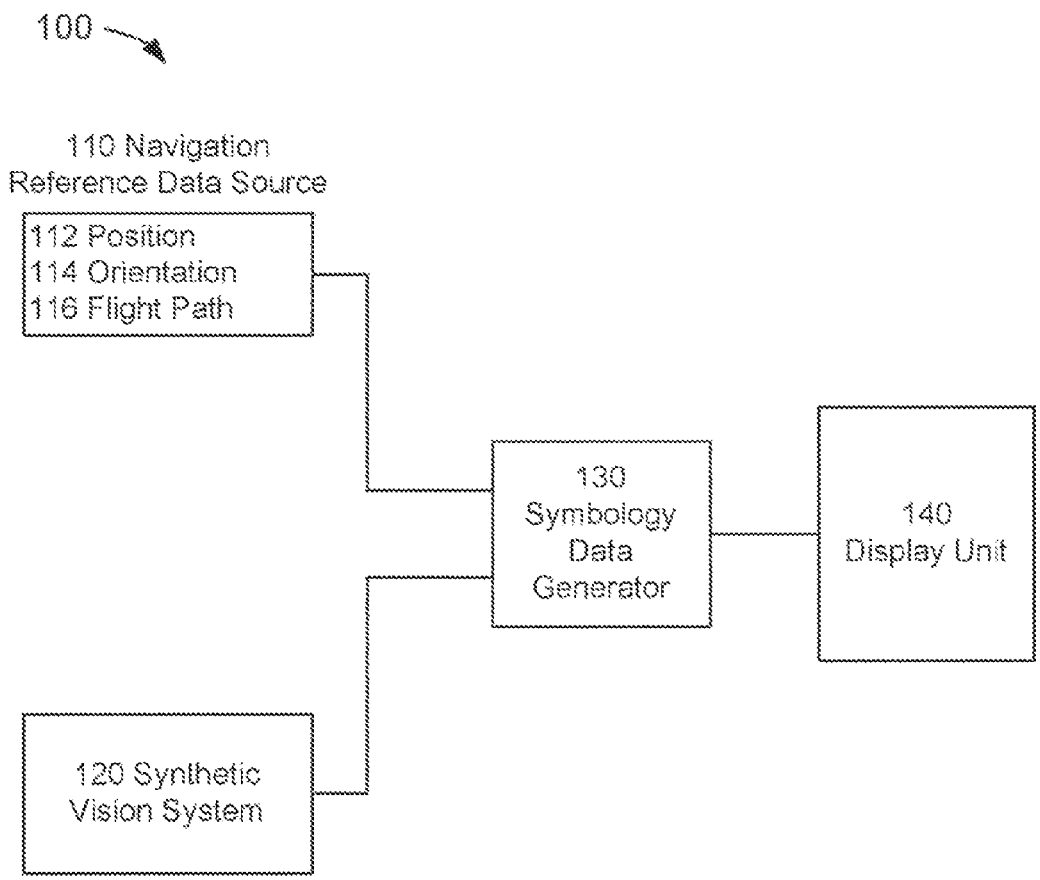
FIG. 1 depicts a block diagram of a system for generating non-linearly spaced graduations for a symbolic linear scale.

FIG. 1 depicts a block diagram of a combined system for an attitude data embedding and detecting inconsistent attitude information system 100 suitable for implementation of the techniques described herein. The combined system 100 of an embodiment of FIG. 1 includes a navigation reference data source 110, a synthetic vision system 120, a symbology data generator 130, and a display unit 140.

In an embodiment of FIG. 1, the navigation reference data source 110 comprises the system or systems that could provide navigation data information in an aircraft. It should be noted that data, as embodied herein for any source or system in an aircraft including a navigation system, could be comprised of any analog or digital signal, either discrete or continuous, which could contain information. As embodied herein, data and signals are treated synonymously. Aircraft could mean any vehicle which is able to fly through the air or atmosphere including, but not limited to, lighter than air vehicles and heavier than air vehicles, wherein the latter may include fixed-wing and rotary-wing vehicles.

The navigation data reference source 110 may include, but is not limited to, an air/data system, an attitude heading reference system, an inertial guidance system (or inertial reference system), a satellite navigation system (of global navigation satellite system "GNSS"), and/or a flight management computing system, all of which are known to those skilled in the art. As embodied herein, the navigation reference data source 110 could be a source for providing navigation reference data including, but not limited to, aircraft position data 112 and aircraft orientation data 114. As embodied herein, position data 112 could comprise geographic position (e.g., latitude and longitude coordinates) and altitude. Orientation data 114 could include data representative of pitch attitude, roll attitude, yaw attitude, and/or heading information related to the attitude of the aircraft. Flight path predictor data 116 could include data representative of a current flight path that could be determined using aircraft position data 112 and orientation data 114, flight plan information provided by a flight management computing system, and/or flight guidance information that could be provided by, but not limited to, an autoflight system and/or flight director system. As embodied herein, navigation reference data may be provided to the symbology data generator ("SD generator") 130 for subsequent processing as discussed herein.

The synthetic vision system ("SVS") 120 is known to those skilled in the art for generating a pixel image data set representative of a three-dimensional perspective of the scene outside of aircraft, where such generating of data set could be accomplished using Open GL. The SVS 120 could be comprised of a terrain database and a processor for generating the pixel image data set based upon aircraft position data 112 provided from the navigation reference data source 110. The SVS 120 could employ topographical colors similar to those depicted on standard aeronautical charts. The three-dimensional perspective and topographical coloring presents an alternative view to the "blue/brown" electronic attitude indicator used in classic electronic primary flight displays ("PFD"), the perspective and coloring scheme that is known to those skilled in the art.

In an embodiment of FIG. 1, the SD generator 130 could receive input data from various sources including, but not limited to, the navigation reference data source 110 and the SVS 120. The SD generator 130 could be employed to accomplish some of the processes and/or procedures disclosed herein including, but not limited to, the method corresponding to flowchart 200 below. The SD generator 130 could provide output data to various systems and/or components including, but not limited to, the data display unit 140.

The SD generator 130 may comprise any processor and/or electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. Processors and/or electronic data processing units may be driven by the execution of software or source code containing algorithms developed for the specific functions embodied herein. Common examples of processors and/or electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. A processor could also consist of more than one electronic data processing units. As embodied herein, the SD generator 130 could be a processor(s) used by or in conjunction with any other system of the aircraft including, but not limited to, a processor(s) incorporated in an indicating system.

In an embodiment of FIG. 1, the display unit 140 could comprise any unit which presents symbolic flight information to the crew of the aircraft including, but not limited to, a Head-Down Display ("HDD") unit and/or a Head-Up Display ("HUD") unit. An HDD unit is typically a unit mounted to an aircraft's flight instrument panel located in front of a pilot and below the windshield and the pilot's field of vision. A HUD unit is mounted in front of the pilot at windshield level and is directly in the pilot's field of vision. A HUD system is advantageous because the display is transparent allowing the pilot to keep his or her eyes "outside the cockpit" while the display unit provides flight information to the pilot The display unit 140 could display the same information found on a PFD, such as "basic T" information (i.e., airspeed, attitude, altitude, and heading). Although it may provide the same information as that of a PFD, the display unit 140 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The display unit 140 is designed to provide flexible configurations which may be tailored to the desired configuration specified by a buyer or user of the aircraft.

Figure 2A:
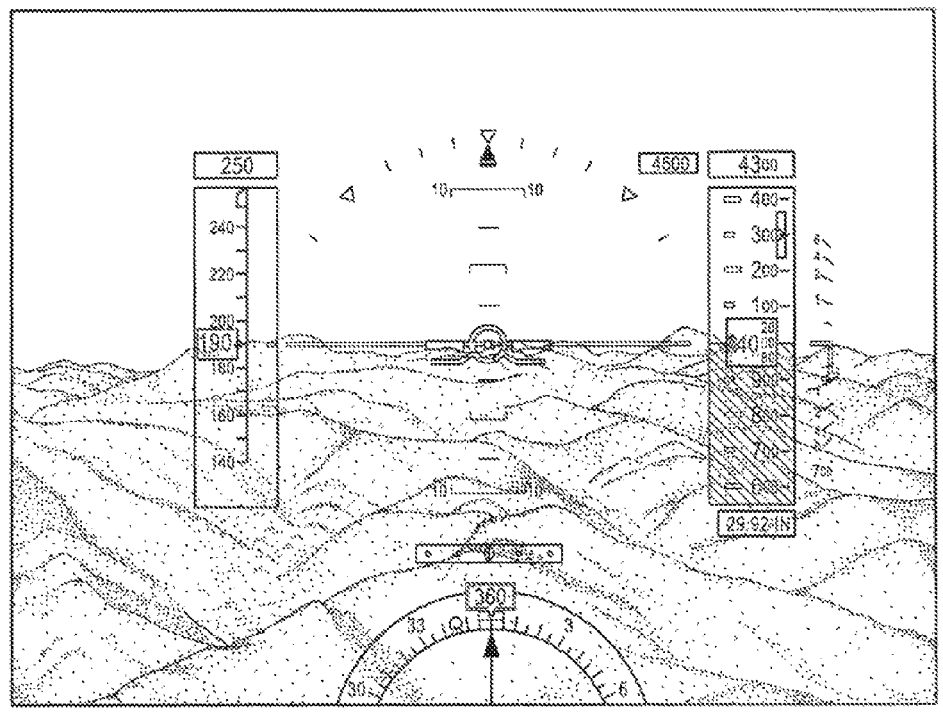
FIG. 2A depicts an exemplary depiction of an HDD unit.

FIG. 2A provides an exemplary depiction of an HDD unit for presenting information to the pilot or flight crew against the background of a three-dimensional image of terrain and sky; an HDD unit could be employed as a display unit in an indicating system. It should be noted that the information or symbology depicted on the HDD unit of FIG. 2A has been made minimal for the sake of presentation and is not indicative of the plurality of indications or information with which it may be configured.

Figure 2B:
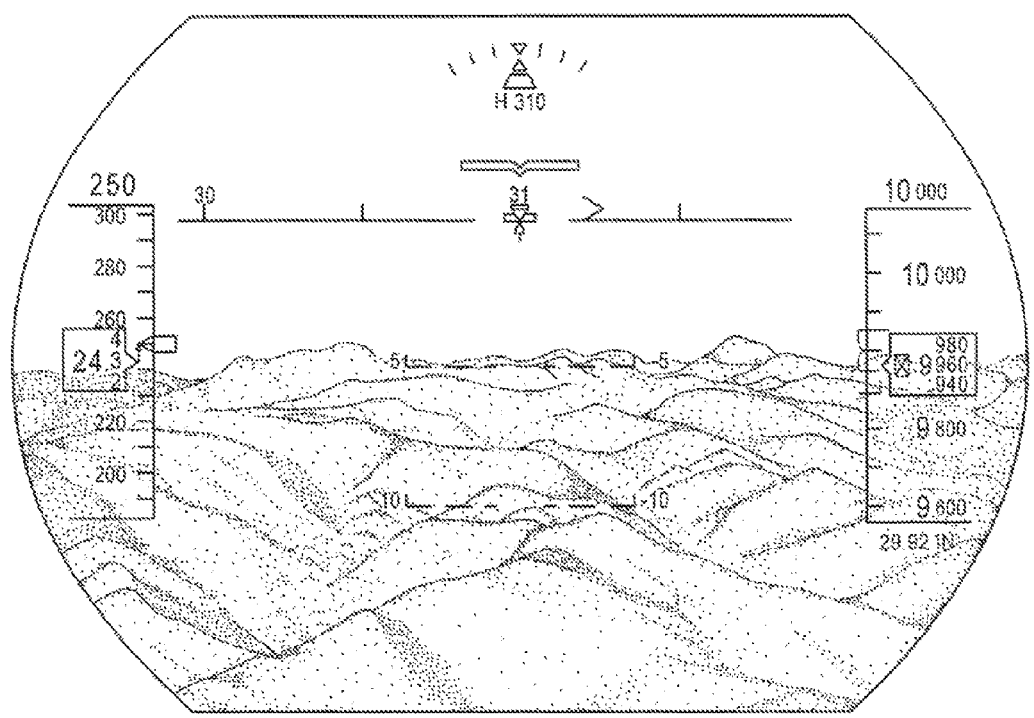
FIG. 2B depicts an exemplary depiction of an HUD unit.

FIG. 2B provides an exemplary depiction of a HUD unit for presenting information to the pilot or flight crew against the background of a three-dimensional image of terrain; similar to the HDD unit of FIG. 2A, a HUD unit could be employed as a display unit in an indicating system. It should be noted that the tactical information or symbology depicted on the HUD unit of FIG. 26 has been made minimal for the sake of presentation and is not indicative of the plurality of indications or information with which it may be configured. Because the indications or information shown in the drawings of FIGS. 2A and 2B are well-known to those skilled in the art, a discussion of the specific tactical information shown on them is not provided herein.

The advantages and benefits of the embodiments discussed herein may be illustrated by discussing the basis of non-linearly spaced graduations and by presenting examples of how non-linearly spaced graduations may be generated for a symbolic linear scale by the SD generator 130. The illustration of FIG. 3A provides a side view of a pyramid frustum that could be defined in the GL_PROJECTION matrix of OpenGL, where such pyramid frustum is known to'those skilled in the art. In a perspective projection as shown in FIG. 3A, a pyramid frustum originating from the vertex (or origin) 0 of the eye coordinate system has four vertices (two of which are points B and C) which form six planes: left, right, bottom, top, near (or projection), and far (or back) planes. In the side view of FIG. 3A, the near plane is indicated with line AD, and the far plane is indicated with line BC. The pyramid frustum may be truncated by the near plane, forming a truncated frustum having eight vertices between the near and far planes. In the side view of FIG. 3A, the truncated frustum is depicted as the trapezoid ABCD. Objects and partial objects falling inside the truncated frustum will be projected onto the projection plane, and those falling outside of the frustum will be clipped out.

As shown in FIG. 3A, points E through N fall within ABCD. Each of these points are located the same distance from O (as indicated by the arc), and angles formed by O and adjacent points have equal angular measurements, i.e., EOF=FOG=GOH=HOJ=EOK=KOL=LOM=MON. For the purpose of illustration only and not of limitation, each angle is assumed to have a measure of 10 degrees. Because each angle equals its adjacent angle(s), adjacent points are equally spaced along the arc. Although points E through N are equally spaced along the arc, they are not equally spaced when projected onto the projection plane as points E' through N'. Instead, the spacing between adjacent points on the projection plane increases outwardly from a reference line OE', where such reference line extends from the origin and forms a right angle with the projection plane. That is, the spacings between adjacent points on the same side from the reference line have unequal linear measurements such that the following is true: E'F'<F'G'<G'H'<H'J' and E'K'<K'L'<L'M'<M'N'. Because the reference line is perpendicular to the projection plane and the angles formed by O and adjacent points have equal angular measurements, corresponding pairs of spacing about the reference line have equal linear measurements: E'F'=E'K', F'G'=G'H'=L'M', and H'J'=M'N'.

The spacing between two points in the projection plane may be determined through trigonometry. For example, the linear distance from point E' on the reference line to point F' may be found by the following: E'F'=OE'*tan(F'OE'). Similarly, the linear distance in the projection plane between the reference line and points G', H', and J' may be found by the following: E'G'=OE'*tan(G'OE'), E'H'=OE'*tan(H'OE'), and E'J'=OE'*tan(J'OE'). From the preceding discussion, it can be seen that the spacing in the projection plane between the reference line and a point in the projection plane may be determined as a function of a constant and a trigonometric function of an angle. That is, the spacing may be determined as a function of the length of the reference line and the tangent of the corresponding angle, where one leg of such angle comprises the reference line and the other leg comprises a line between the origin and the point.

After being projected on the projection plane, points E' through N' may be subjected to the viewpoint transformation of OpenGL, i.e., may be scaled and translated into screen coordinates in order to fit the screen of a display unit. During the viewpoint transformation, the ratio of spacing between points on the projection plane remains constant. Hence, the same algorithms used in determining spacing between points on the projection plane may be applied on a scale applicable to screen size such as, but not limited to, pixels and/or millimeters.

Figure 3B:
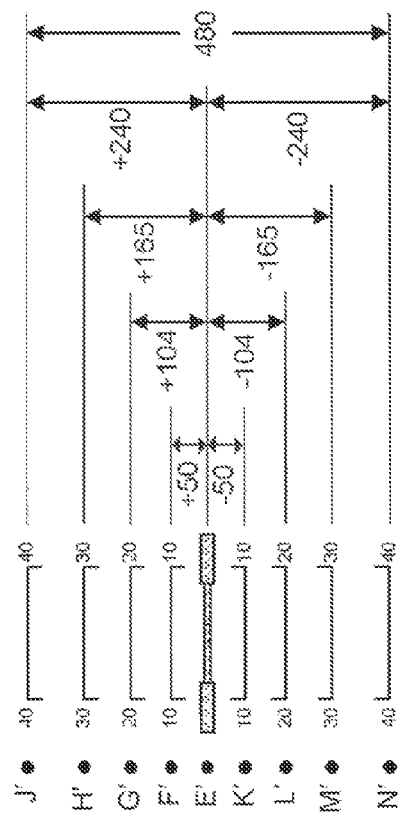
FIG. 3B depicts the non-linearity of spacing of graduations of a linear pitch scale corresponding to FIG. 3A.
Figure 3A:
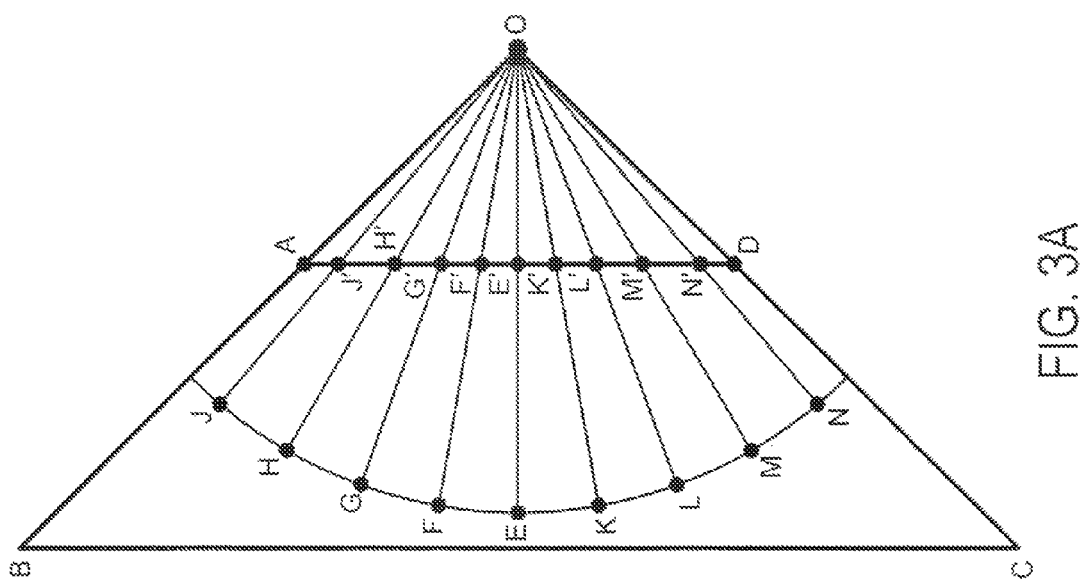
FIG. 3A depicts a side view of a pyramid frustum with an aircraft operating at zero pitch attitude.

The illustration of FIG. 3B illustrates the non-linearity of spacing of graduations of a linear pitch scale that may be depicted as symbology on the screen of a display unit based on a proportional scaling and translation of points J' through N' (from top to bottom) of FIG. 3A from the projection plane to the screen. As shown in FIG. 3B, each graduation corresponds to point(s) of a specific pitch angle graduation. Points E & E' correspond to the zero degree pitch angle graduation; points F & F' and K & K' correspond to the +10 and −10 degrees pitch angle graduations, respectively; points G & G' and L & L' correspond to a +20 and −20 degrees pitch angle graduations, respectively; points H & H' and M & M' correspond to a +30 and −30 degrees pitch angle graduations, respectively; and points J & J' and N & N' correspond to a +40 and −40 degrees pitch angle graduations, respectively. As shown in the symbology of FIG. 3B, the pitch attitude of an aircraft is zero pitch or zero degrees.

In order to determine the spacing between graduations, a manufacturer may assign and/or configure the size of the scale occupied on the screen. For the purpose of illustration and not of limitation, the assigned size of the 80-degree scale shown in FIG. 3B is assumed to be 480 pixels, where the assigned size of the upper half and the lower half is 240 pixels each. Because the spacing between the 0 degree and +40 degree graduations has been assigned 240 pixels at an aircraft attitude of zero pitch, a pixel-scale constant (psc) may be determined, where such pixel-scale constant corresponds to the length of the reference line OE' of the projection plane prior to the scaling and transformation operations. Using the algorithm discussed above, psc=240 pixels/tan(40), which approximately equals 286 pixels.

It should be noted that the depicted 80-degree scale extending between −40 degrees and +40 degrees at zero pitch angle is depicted for the purpose of illustration only and not limitation. The size of the scale and the look of the symbology are configurable. As shown in FIG. 2A, the pitch scale has been configured as a 20-degree scale extending between −10 degrees and +10 degrees at zero pitch angle.

After the pixel-scale constant has been determined, the spacing (sp) of each graduation with respect to a central reference may be determined from the algorithm discussed above: sp=psc*tan(graduation reference−central reference). Here, the location of the central reference is indicted by the pitch pointer or object shown in the center of the scale (adjacent to point E') and corresponds to the aircraft attitude which, for the purpose of the illustration of FIG. 3B, is zero degrees. The spacing of the +10 graduation reference from the central reference of zero degrees (sp(+10, 0)) is approximately +50 pixels as found by the following: sp(+10, 0)=286*tan(+10−0). Application of the algorithm to the +20 and +30 graduation references results in approximate spacings of +104 and +165 pixels, respectively, from the central reference. Similarly, application of the algorithm to the −10, −20, and −30 graduation references from the central reference results in approximate spacings of −50, −104, and −165 pixels, respectively, where the negative sign indicates the spacing below the central reference. From these results, the non-linearity of spacings between adjacent graduations may be observed; for example, the spacings between the +10 and +20 angle graduations, +20 and +30 angle graduations, and +30 and +40 angle graduations approximately equal 54, 61, and 75 pixels, respectively.

Figure 4B:
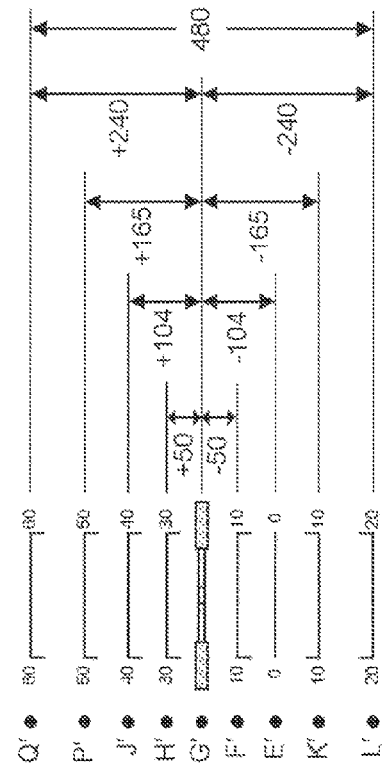
FIG. 4B depicts the non-linearity of spacing of graduations of a linear pitch scale corresponding to FIG. 4A.
Figure 4A:
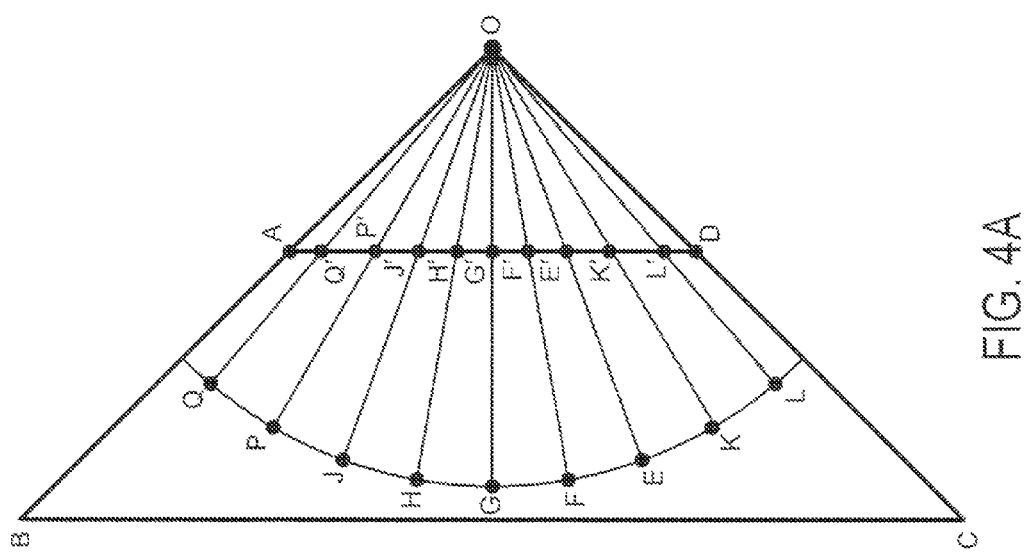
FIG. 4A depicts a side view of a pyramid frustum with an aircraft operating at +20 degrees pitch attitude.

The drawings of FIG. 4 correspond to an aircraft having a +20 degrees pitch attitude. Because angle EOG corresponds to a +20 degrees pitch angle, line OG' represents the reference line in FIG. 4A, and spacings are now made in reference to line OG' as compared with line OE' of FIG. 3A. Now, the spacings shown in FIG. 4A between adjacent points have changed to the following: G'H'<H'J'<J'P'<P'Q' and F'G'<E'F'<E'K'<K'L', where angles JOP and POQ are assumed to each have a measurement of 10 degrees. When compared with FIG. 3A, differences in spacings are noted. In FIG. 3A, E'F'<F'G' and F'G'<G'H'; in FIG. 4A, however, F'G'=G'H' and F'G'<E'F'. Also, corresponding pairs of spacing about the reference line OG' having equal linear measurements have changed to the following in FIG. 4A: G'H'=F'G', H'J'=E'F', J'P'=E'K', and P'Q'=K'L'.

The illustration of FIG. 4B illustrates the non-linearity of spacing of graduations of a linear pitch scale based on a proportional scaling and translation of points Q' through L' (from top to bottom) of FIG. 4A from the projection plane to the screen. As discussed above, the spacing of each graduation with respect to the central reference may be determined from the algorithm discussed above: sp=psc*tan(graduation reference−central reference). Here, the central reference corresponds to the aircraft attitude of +20 degrees pitch. The spacing of the +30 graduation reference from the central reference of +20 degrees pitch (sp(+30, +20)) is approximately +50 pixels as found by the following: sp(+30, +20)=286*tan(+30−20). Application of the algorithm to the +40 and +50 graduation references results in approximate spacings of +104 and +165 pixels, respectively. Similarly, the spacings of the +10, 0, and −10 graduation references from the central reference results in approximate spacings of −50, −104, and −165 pixels, respectively. From these results, the non-linearity of spacings between adjacent graduations may be observed, where the spacing between the +10 and +20 graduation references, +20 and +30 graduation references, and +30 and +40 graduation references approximately equal 50, 50, and 54 pixels, respectively. Moreover, as a result of the 20 degree pitch change from the zero pitch shown in the drawings of FIG. 3B, the spacings between these specific graduations are different from the respective spacings.

Figure 5B:
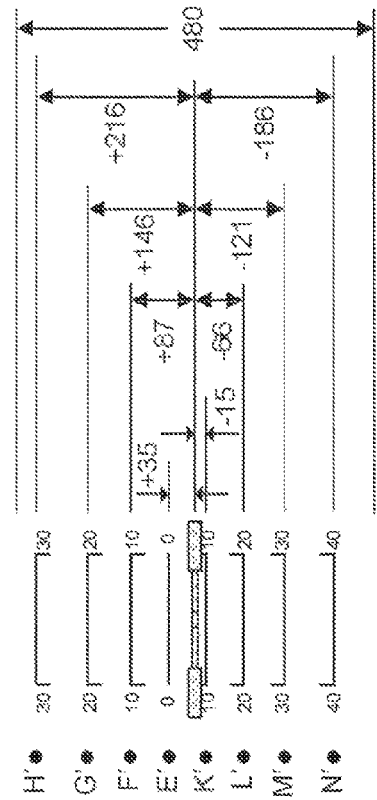
FIG. 5B depicts the non-linearity of spacing of graduations of a linear pitch scale corresponding to FIG. 5A.
Figure 5A:
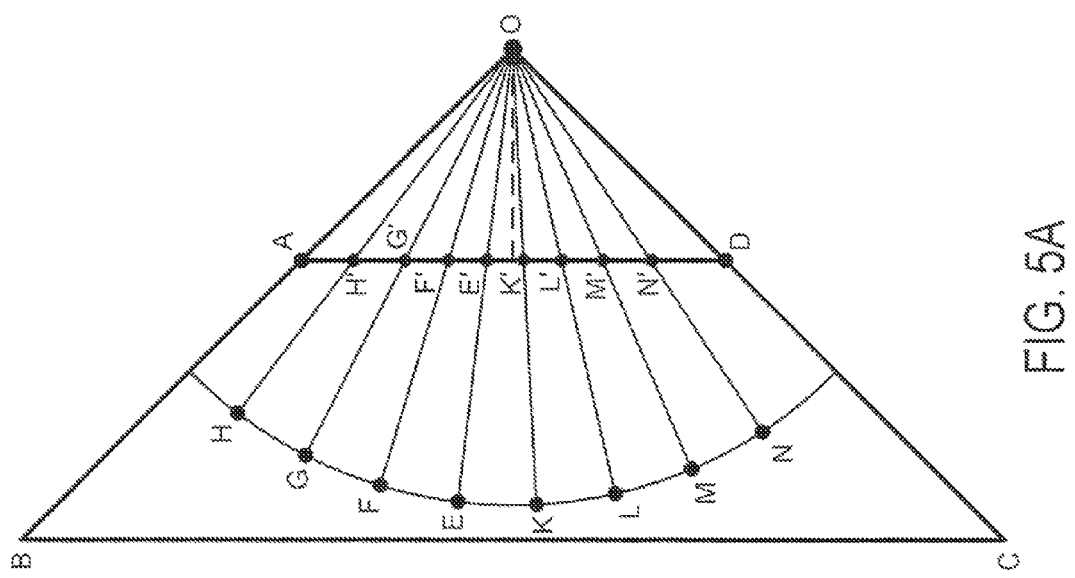
FIG. 5A depicts a side view of a pyramid frustum with an aircraft operating at −7 degrees pitch attitude.

The drawings of FIG. 5 correspond to an aircraft having a −7 degrees pitch attitude. As shown in FIG. 5A, none of the angles formed by point O and adjacent points correspond to a −7 degree pitch angle. A reference line extending between point O and the projection plane is indicated by the dashed line, where the reference line is perpendicular to the projection plane.

The illustration of FIG. 5B illustrates the non-linearity of spacing of graduations of a linear pitch scale based on a proportional scaling and translation of points H' through N' (from top to bottom) of FIG. 5A from the projection plane to the screen. Here, the central reference corresponds to the aircraft attitude of −7 degrees pitch. Applying the preceding algorithm, the spacing of the zero graduation reference from the central reference of −7 degrees pitch (sp(0, −7)) is approximately +35 pixels as found by the following: sp(0, −7)=286*tan(0−(−7)). Application of algorithm to the +10, +20, and +30 graduation references results in approximate spacings of +87, +146 and +216 pixels, respectively, from the central reference. Similarly, the spacings of the −10, −20, −30, and −40 graduation references from the central reference approximately equal −15, −66, and −121, and −186 pixels, respectively, from the central reference. From these results, the non-linearity of spacings between adjacent graduations may be observed, where the spacing between the +10 and +20 graduation references and +20 and +30 graduation references are approximately equal to 59 and 70 pixels, respectively. Moreover, as a result of the pitch differences from the two preceding drawings, the spacings between these specific graduations are different from the respective spacings.

Although the preceding discussion has been drawn to a linear scale of pitch, the embodiments herein apply to any linear scale of the scene outside the aircraft including a direction scale. An example of a direction scale is the linear heading scale shown in FIG. 2B. The approach in determining non-linear graduation spacing of a linear heading scale follows the same approach that was followed above for the pitch scale; however, a different frame of reference is used producing some differences. Instead of using a side view of a truncated frustum, a top view of the truncated frustum could be used. Instead of assigning each graduation to correspond to a point of a specific pitch angle, each graduation could correspond to a point of a specific heading. A manufacturer may assign and/or configure the size of the heading scale occupied on the screen and determine a heading pixel scale constant. Then, the spacing (sp) of each graduation with respect to a central reference may be determined from the same algorithm disclosed above: sp=psc*tan(graduation reference−central reference), where psc is the heading pixel scale constant, graduation reference may be the heading assigned to the graduation, and the central reference could be the current heading of the aircraft. Instead of graduations appearing above and below the central reference found in a linear scale of pitch, graduations of a linear scale of heading could appear right and left of the central reference.

Once a linear scale(s) has been generated, symbology representing one or more flight path predictors may be matched to screen coordinates corresponding to the scale(s), where a flight path predictor could be, but is not limited to, a flight path vector, flight director, and/or highway-in-the-sky; the generation of image data representative of flight path predictor symbology and presentation of such symbology on a display unit are known to those skilled in the art. Once the spacings of the non-linear graduations have been determined and because each graduation has an assigned graduation reference (e.g., specific pitch attitude or specific heading), screen coordinates corresponding to each graduation reference may be determined and used to map the screen location of the symbology of each flight path predictor.

Figure 6:
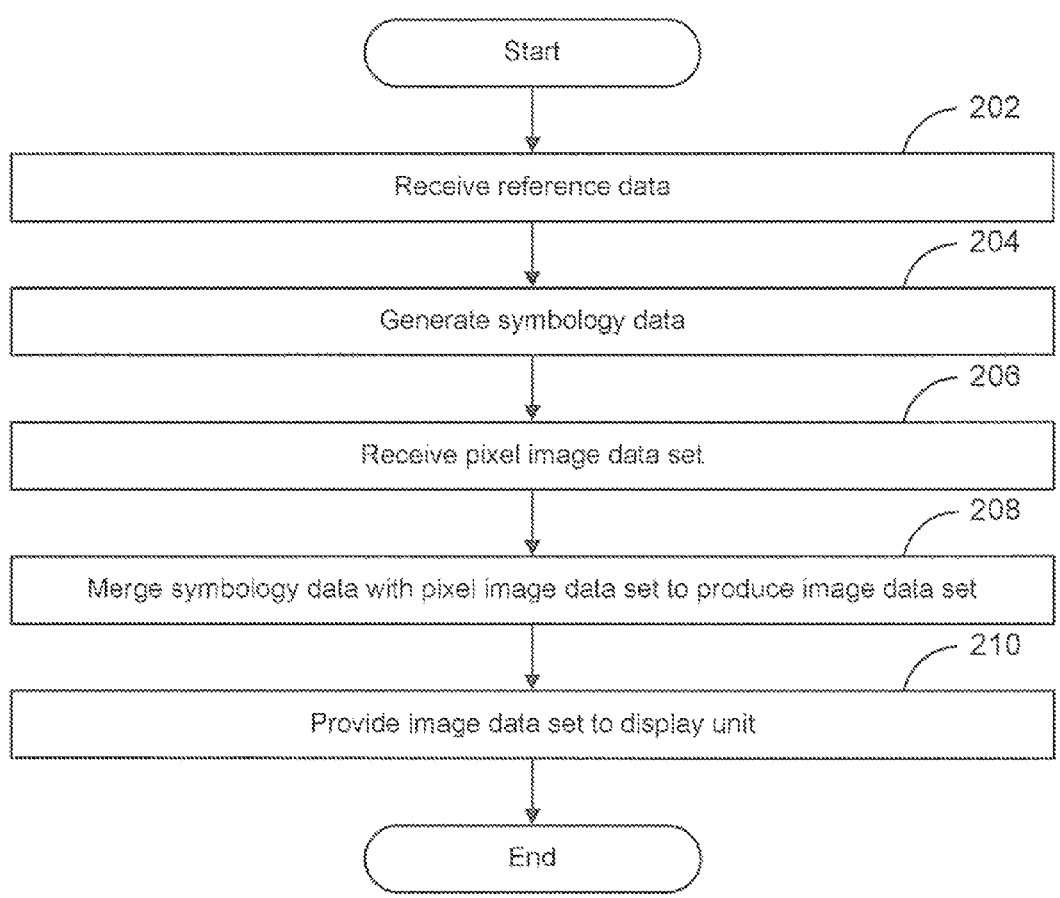
FIG. 6 depicts a flowchart of an exemplary method for generating non-linearly spaced graduations of a symbolic linear scale conformal to the scene outside the aircraft.

FIG. 6 depicts a flowchart 200 of an example of a method for generating non-linearly spaced graduations of a symbolic linear scale conformal to the scene outside the aircraft, where the SD generator 130 may be programmed or configured with instructions corresponding to the following modules. As embodied herein, the SD generator 130 may be a processor of the synthetic vision system 120. Also, the SD generator 130 may be a processor of a module such as, but not limited to, a printed circuit card which comprises one or more input interfaces to facilitate data communications with the SD generator 130, i.e., the receiving and providing of data. As necessary for the accomplishment of the following modules embodied in FIG. 6, the receiving of data is synonymous and/or interchangeable with the retrieval of data, and the providing of data is synonymous and/or interchangeable with the making available or supplying of data.

The method begins with module 202 with the receiving of navigation reference data from the navigation reference data source 110. In one embodiment, navigation reference data could comprise data representative of pitch attitude. In another embodiment, navigation reference data could comprise data representative of aircraft heading. As embodied herein, the navigation reference data source 110 could comprise a system(s) that provides navigation data information.

The method continues with module 204 with the generating of symbology data representative of one or more linear scales of symbology comprised of a plurality of graduations that are not linearly spaced. As embodied herein, the non-linear spacing of each graduation may be determined as a function of a constant and a trigonometric function of a graduation reference assigned to the graduation and the navigation reference data.

In an embodiment where the navigation reference data comprises data representative of pitch attitude, the linear scale could provide a measurement of pitch attitude. Each graduation reference could be assigned a specific pitch angle, and the pitch attitude could be used as a central reference. The tangent of an angle could be multiplied by a constant, where such angle could correspond to the difference between the specific angle assigned to the graduation and the pitch attitude angle, and the constant could be determined from the scale size in relation to the screen. The resulting product could correspond to the measurement of spacing up or down from the central reference.

In an embodiment where the navigation reference data comprises data representative of aircraft heading, the linear scale could provide a measurement of aircraft heading. Each graduation reference could be assigned a specific heading, and the aircraft heading could be used as a central reference. The tangent of an angle could be multiplied by a constant, where such angle could correspond to the difference between the specific heading assigned to the graduation and the aircraft heading, and the constant could be determined from the scale size in relation to the screen. The resulting product could correspond to the measurement of spacing to the right or left from the central reference.

Optional modules may be incorporated into the method after the generation of the symbology data for the preparing and presenting on the screen of the display unit 140 one or more linear scales against the background of a three-dimensional perspective of a scene outside the aircraft. The method continues with module 206 with the receiving of a pixel image data set from pixel image data source representative of a three-dimensional perspective of the scene outside the aircraft. As embodied herein, pixel image data source may comprise a synthetic vision system.

The method continues with module 208 with the merging of the symbology data with the pixel image data set to produce an image data set. The image data set comprises data representative of one or more symbolic linear scales comprised of a plurality of non-linearly spaced graduations conformal to the scene outside the aircraft. Each symbolic scale may be presented against the background of a three-dimensional perspective of the scene outside the aircraft.

In an additional embodiment, data representative of at least one flight path predictor may be included in the production of the image, data set, where a flight path predictor could include, but is not limited to, a flight path vector, flight director, and/or highway-in-the-sky. The symbology of each flight path predictor may be mapped to screen coordinates corresponding to each generated symbolic linear scale and presented against the background of the three-dimensional perspective of the scene outside the aircraft.

The method continues with module 210 with the providing of the image data set to the display unit 140, whereby an image represented in the image data set is presented on the screen of an aircraft display unit. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all-such modifications, permutations, enhancements, and equivalents as falling within the true spirit and scope of the present invention.

What is claimed is:

1. A system for generating parallel, non-linearly spaced graduations for a symbolic linear scale, such system comprising:
   a source for providing navigation reference data; and
   a symbology data generator configured to
      generate symbology data representative of at least one symbolic linear scale comprised of parallel, non-linearly spaced graduations, where
         the spacing of each graduation is determined as a function of a constant and a trigonometric function of a graduation reference assigned to the graduation and the navigation reference data.

2. The system of claim 1, wherein
   the navigation reference data is comprised of data representative of pitch attitude, and
   the symbolic linear scale provides a measurement of pitch attitude.

3. The system of claim 2, wherein pitch attitude is used as a central reference from which spacing is measured.

4. The system of claim 1, wherein
   the navigation reference data is comprised of data representative of aircraft heading, and
   the symbolic linear scale provides a measurement of aircraft heading.

5. The system of claim 4, wherein aircraft heading is used as a central reference from which spacing is measured.

6. The system of claim 1, wherein the value of the constant is dependent on the size of the symbolic linear scale.

7. The system of claim 1, further comprising:
   a source for providing a pixel image data set, where
      the symbology data generator is further configured to
         receive the pixel image data set,
         merge the symbology data with the pixel image data set to produce an image data set, where
            the image data set is representative of at least one symbolic linear scale comprised of parallel, non-linearly spaced graduations conformal to the scene outside the aircraft, where
               each scale is presented against the background of a three-dimensional perspective of the scene outside the aircraft, and
            provide the image data set to a display unit; and
   the display unit for receiving configured to receive the image data set, whereby
      an image represented in the image data set is presented on the screen of the display unit.

8. The system of claim 7, wherein
   the navigation reference data is comprised of data representative of at least one flight path predictor, such that
      the production of the image data set includes the data representative of at least one flight path predictor, such that
         the symbology of each flight path predictor is mapped to screen coordinates corresponding to each generated symbolic linear scale and presented against the background of a three-dimensional perspective of the scene outside the aircraft.

9. A module for generating parallel, non-linearly spaced graduations for a symbolic linear scale, such module comprising:
   an input communications interface configured to facilitate a receiving of navigation reference data from a navigation reference data source;
   a symbology data generator configured to
      receive the navigation reference data, and
      generate symbology data representative of at least one symbolic linear scale comprised of parallel, non-linearly spaced graduations, where
         the spacing of each graduation is determined as a function of a constant and a trigonometric function of a graduation reference assigned to the graduation and the navigation reference data; and
   an output communications interface.

10. The module of claim 9, wherein
    the navigation reference data is comprised of data representative of pitch attitude, and
    the symbolic linear scale provides a measurement of pitch attitude.

11. The module of claim 10, wherein pitch attitude is used as a central reference from which spacing is measured.

12. The module of claim 9, wherein
    the navigation reference data is comprised of data representative of aircraft heading, and
    the symbolic linear scale provides a measurement of aircraft heading.

13. The module of claim 12, wherein aircraft heading is used as a central reference from which spacing is measured.

14. The module of claim 9, wherein the value of the constant is dependent on the size of the symbolic linear scale.

15. The module of claim 9, wherein
    the input communications interface is further configured to facilitate a receiving of a pixel image data set from a pixel image data source, where
       the symbology data generator is further configured to
          receive the pixel image data set,
          merge the symbology data with the pixel image data set to produce an image data set, where
             the image data set is representative of at least one symbolic linear scale comprised of parallel, non-linearly spaced graduations conformal to the scene outside the aircraft, where
                the scale is presented against the background of a three-dimensional perspective of the scene outside the aircraft, and
             provide the image data set to the output communications interface to facilitate the providing of the image data set to a display unit, whereby
                an image represented in the image data set is presented on the screen of the display unit.

16. The module of claim 15, wherein
    the navigation reference data is comprised of data representative of at least one flight path predictor, such that
       the production of the image data set includes the data representative of at least one flight path predictor, such that the symbology of each flight path predictor is mapped to screen coordinates corresponding to each generated symbolic linear scale and presented against the background of a three-dimensional perspective of the scene outside the aircraft.

17. A method for generating parallel, non-linearly spaced graduations for a symbolic linear scale, such method comprising:
receiving the navigation reference data from a navigation reference data source, and
generating symbology data representative of at least one symbolic linear scale comprised of parallel, non-linearly spaced graduations, where
the spacing of each graduation is determined as a function of a constant and a trigonometric function of a graduation reference assigned to the graduation and the navigation reference data.

18. The method of claim 17, wherein
the navigation reference data is comprised of data representative of pitch attitude, and
the symbolic linear scale provides a measurement of pitch attitude.

19. The method of claim 18, wherein pitch attitude is used as a central reference from which spacing is measured.

20. The method of claim 17, wherein
the navigation reference data is comprised of data representative of aircraft heading, and
the symbolic linear scale provides a measurement of aircraft heading.

21. The method of claim 20, wherein aircraft heading is used as a central reference from which spacing is measured.

22. The method of claim 17, wherein the value of the constant is dependent on the size of the symbolic linear scale.

23. The method of claim 17, further comprising:
receiving a pixel image data set from a pixel image data source,
merging the symbology data with the pixel image data set to produce an image data set, where
the image data set is representative of at least one symbolic linear scale comprised of parallel, non-linearly spaced graduations conformal to the scene outside the aircraft, where
the scale is presented against the background of a three-dimensional perspective of the scene outside the aircraft, and
providing the image data set to a display unit, whereby
an image represented in the image data set is presented on the screen of the display unit.

24. The method of claim 18, wherein
the navigation reference data is comprised of data representative of at least one flight path predictor, such that
the production of the image data set includes the data representative of at least one flight path predictor, such that
the symbology of each flight path predictor is mapped to screen coordinates corresponding to each generated symbolic linear scale and presented against the background of a three-dimensional perspective of the scene outside the aircraft.

* * * * *